US011640384B2

(12) United States Patent
Yang et al.

(10) Patent No.: US 11,640,384 B2
(45) Date of Patent: May 2, 2023

(54) DATABASE PROCESSING METHOD, APPARATUS, AND ELECTRONIC DEVICE

(71) Applicant: ALIBABA GROUP HOLDING LIMITED, Grand Cayman (KY)

(72) Inventors: Lian Yang, Hangzhou (CN); Shaoqiang Jing, Hangzhou (CN); Shiquan Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 661 days.

(21) Appl. No.: 15/729,599

(22) Filed: Oct. 10, 2017

(65) Prior Publication Data

US 2018/0101563 A1 Apr. 12, 2018

(30) Foreign Application Priority Data

Oct. 10, 2016 (CN) .......................... 201610884605.0

(51) Int. Cl.
*G06F 16/36* (2019.01)
*G06F 16/23* (2019.01)
*G06F 16/22* (2019.01)

(52) U.S. Cl.
CPC ...... *G06F 16/2365* (2019.01); *G06F 16/2282* (2019.01); *G06F 16/2336* (2019.01)

(58) Field of Classification Search
None
See application file for complete search history.

(56) References Cited

U.S. PATENT DOCUMENTS

| 5,327,557 | A | | 7/1994 | Emmond | |
|---|---|---|---|---|---|
| 6,052,695 | A | * | 4/2000 | Abe | ..................... G06F 11/1471 |
| 2006/0224634 | A1 | | 10/2006 | Hahn et al. | |
| 2006/0224807 | A1 | * | 10/2006 | Ishikawa | ............... G06F 13/364 |
| | | | | | 710/241 |
| 2006/0253856 | A1 | | 11/2006 | Hu et al. | |

(Continued)

FOREIGN PATENT DOCUMENTS

| CN | 101652761 A | 2/2010 |
|---|---|---|
| CN | 101699439 A | 4/2010 |

(Continued)

OTHER PUBLICATIONS

Extended European Search Report dated Jun. 18, 2019, European Application No. 17860652-1 (7 pgs.).

(Continued)

*Primary Examiner* — Thu N Nguyen
(74) *Attorney, Agent, or Firm* — Finnegan, Henderson, Farabow, Garrett & Dunner, LLP

(57) ABSTRACT

Embodiments of the disclosure provide a database processing method, a database processing apparatus, and an electronic device. The database processing method can include: providing a plurality of transactions to a transaction queue, wherein each transaction of the plurality of transactions includes an encapsulated write request for writing data into a database; generating auto-increment identifiers (IDs) for data rows of the data corresponding to the plurality of transactions according to an order of the transactions in the transaction queue; and writing the data into the database according to the auto-increment IDs assigned to the data rows of the data in the transaction.

18 Claims, 6 Drawing Sheets

(56) References Cited

U.S. PATENT DOCUMENTS

| | | | |
|---|---|---|---|
| 2007/0061379 A1 | 3/2007 | Wong et al. | |
| 2007/0239758 A1 | 10/2007 | Devine et al. | |
| 2008/0071781 A1* | 3/2008 | Ninan | G06F 16/90344 |
| 2009/0217274 A1 | 8/2009 | Corbin et al. | |
| 2010/0257404 A1 | 10/2010 | Singh | |
| 2011/0029498 A1 | 2/2011 | Ferguson et al. | |
| 2011/0145255 A1* | 6/2011 | Kim | G06F 16/2246 707/E17.012 |
| 2011/0196900 A1* | 8/2011 | Drobychev | G06F 16/23 707/812 |
| 2011/0246434 A1 | 10/2011 | Cheenath et al. | |
| 2012/0030172 A1 | 2/2012 | Pareek et al. | |
| 2012/0166407 A1 | 6/2012 | Lee et al. | |
| 2012/0330913 A1 | 12/2012 | Devadhar | |
| 2015/0199415 A1 | 7/2015 | Bourbonnais et al. | |
| 2015/0242451 A1 | 8/2015 | Bensberg et al. | |
| 2016/0078077 A1* | 3/2016 | Gandhi | G06F 16/2365 707/703 |
| 2016/0085639 A1* | 3/2016 | Abouzour | G06F 11/1471 707/648 |

FOREIGN PATENT DOCUMENTS

| | | | |
|---|---|---|---|
| CN | 102156720 A | 8/2011 | |
| CN | 102193981 A | 9/2011 | |
| CN | 102831156 A | 12/2012 | |
| CN | 103221949 A | 7/2013 | |
| CN | 103885986 A | 6/2014 | |
| JP | 2010-128518 A | 6/2010 | |

OTHER PUBLICATIONS

Notification of Transmittal of the International Search Report and the Written Opinion of the International Searching Authority, or the Declaration issued in International Application No. PCT/US2017/55915; dated Dec. 22, 2017 (10 pgs.).

First Chinese Office Action issued in Chinese Application No. 201610884605.0 dated Apr. 25, 2021, 6 pages.

Zhiming, Wang, "Research and Optimition of Mobile Data Synchronization Process Based on SyncML," https://vault.netvoyage.com/neWeb2/workspace/:Q9:r:b:7:1:%5EW170720130039151.nev/docs/list.

企业级 Java EE商业项目开发, https://www.amazon.com/%E4%BC%81%E4%B8%9A%E7%BA%A7Java-EE%E5%95%86%E4%B8%9A%E9%A1%B9%E7%9B%AE%E5%BC%80%E5%8F%91-%E4%BA%91%E8%B4%B5%E5%85%A8%EF%BC%8C%E5%BC%A0%E9%91%AB/dp/B017LCK6MG, pp. 12-129 (2015).

Japanese Search Report issued in corresponding Japanese Application No. 2019-516411 dated Jun. 8, 2021 (11 pages).

Mick, "$2^{nd}$ Time the 'imperfect' mechanism of performing 'restore data' which a database understands if a transaction is got to know, and 'concurrency control,'" WEB+DB Press, vol. 58, $1^{st}$ edition, Technical Hyoronsha, Sep. 25, 2010, 130-138 pages. (Reference not available).

Miyagawa, "It is what kind of thing as world fastest database MySQL thoroughness capture and the Chapter 1 MySQL besides Tatsuhiko? The one first step of the Chapter 2 MySQL I will use the eyeball funcation of Chapter 3 MySQL 4 Chapter 4 from Program to MySQL Operation Chapter 5 Trouble Prevention Tips Collection, Chapter 6 Chich Convenient Tool Which is Useful on the Spot," WEB+DB Press, vol. 16, $1^{st}$ Edition, Technical Hyoronsha, Sep. 20, 2003, pp. 89-121. (Reference not available).

The Examination issued by the European Patent Office in corresponding European Application No. 17860652.1, dated Dec. 22, 2020. (8 pages).

Supplemental Search Report issued in corresponding Chinese Application No. 201610884605.0 dated Jan. 6, 2022 (1 page).

* cited by examiner

DATABASE PROCESSING METHOD, APPARATUS, AND ELECTRONIC DEVICE

CROSS REFERENCE TO RELATED APPLICATION

The disclosure claims the benefits of priority to Chinese Application No. 201610884605.0, filed Oct. 10, 2016, which is incorporated herein in its entirety.

BACKGROUND

A database may generally implement an auto-increment column in a table. Data in the auto-increment column can be automatically incremented. For example, in a first row of the auto-increment column, the value corresponding to the first row is 1, and in a second row, the value corresponding to the second row is 2, and so on.

In some databases, (e.g., MySQL), auto-increment columns can include two types of locks: a table-level auto-increment lock and a lightweight auto-increment lock. The table-level auto-increment lock can be used before an operation, and released after the operation is completed. The table-level auto-increment lock can ensure a serial increment but can severely affect the concurrency performance, and is rarely used in practice. The lightweight lock only works when auto-increment is applied, which allows high-concurrency. However, the lightweight lock cannot ensure that an earlier request for the auto-increment can be written first, therefore failing to satisfy the requirement of a serial auto-increment.

A column auto-increment function for a primary key provided in a conventional stand-alone database can generate a unique number when a new record is inserted into a table, and the number is an incremental natural number. The column auto-increment function may satisfy the requirement of uniqueness of the primary key, but cannot satisfy the requirement of serial auto-incrementing. And if the serial auto-incrementing is needed, all operations need to be executed in serial. However, the serial auto-incrementing may reduce the concurrency performance of the database, and result in the database being essentially unavailable in a highly concurrent application.

However, in certain highly concurrent applications, a strict serial auto-increment is required, while highly concurrent performance needs to be ensured. For example, in a communication service, a plurality of users are sending messages to a user A. That is, multiple threads concurrently insert data into a same partition of the database, and the background continuously reads newly arriving messages for the user A. To ensure that the background does not lose messages, it is necessary that the messages sent to the user are in serial when no auto-increment column function is used. The above process is complicated and the concurrency performance of the process is not good. When the auto-increment function provided in the database is used, the two requirements (e.g., ensuring the serial auto-increment and ensuring highly concurrent performance) cannot be satisfied at the same time.

SUMMARY

Embodiments of the disclosure provide a database processing method. The database processing method can include: providing a plurality of transactions to a transaction queue, wherein each transaction of the plurality of transactions includes an encapsulated write request for writing data into a database; generating auto-increment identifiers (IDs) for data rows of the data corresponding to the plurality of transactions according to an order of the transactions in the transaction queue; and writing the data into the database according to the auto-increment IDs assigned to the data rows of the data corresponding to the plurality of transactions.

In some embodiments, an auto-increment ID for each data row of the data of a precedent transaction in the transaction queue is less than an auto-increment ID for each data row of the data of a later transaction in the transaction queue.

When one transaction contains a plurality of data rows of the data, the auto-increment ID of a precedent data row in the transaction is less than the auto-increment ID of a later data row.

The database processing method can further include: writing log data corresponding to the plurality of transactions in the transaction queue in a log, the log data including the auto-increment IDs of the data rows of the data in the corresponding plurality of transactions; and submitting the plurality of transactions corresponding to the log data in the log, and writing the data into the database while assigning the data rows of the data in the plurality of transactions with the auto-increment IDs for the data rows of the data.

The database can include a plurality of partitions, each partition of the plurality of partitions maintains the auto-increment IDs that are independent from auto-increment IDs of other partitions.

The database processing method can further include: providing the plurality of transactions to a transaction queue corresponding to a partition where the transactions of the plurality of transactions belong.

Optionally, generating auto-increment identifiers can further include: for each transaction in the transaction queue, generating a batch of auto-increment IDs for the data rows of the data in the transaction according to system time and a number of the data rows contained in the transaction.

In some embodiments, for the data rows in each transaction in the transaction queue, a range of the generated auto-increment IDs is: from one to the number of data rows contained in the transaction, plus a greater one of the following two numerical values: the value of the auto-increment ID generated last time, and system time.

Embodiments of the disclosure further provide a database processing apparatus. The database processing apparatus can include:

an encapsulation module, configured to provide a plurality of transactions to a transaction queue, wherein each transaction of the plurality of transactions includes an encapsulated write request for writing data into a database;

a generation module, configured to generate auto-increment identifiers (IDs) for data rows of the data corresponding to the plurality of transactions according to an order of the transactions in the transaction queue; and an writing module, configured to write the data in the database according to the auto-increment IDs assigned to the data rows of the data corresponding to the plurality of transactions.

In some embodiments, an auto-increment ID for each data row of the data of a precedent transaction in the transaction queue is less than an auto-increment ID for each data row of the data of a later transaction in the transaction queue.

When one transaction contains a plurality of data rows of the data, the auto-increment ID of a precedent data row in the transaction is less than the auto-increment ID of a later data row.

The writing module can further include:

a log writing unit, configured to write log data corresponding to the plurality of transactions in the transaction queue in a log, the log data including the auto-increment IDs of the data rows of the data in the corresponding plurality of transactions; and a database writing unit, configured to submit the plurality of transactions corresponding to the log data in the log, and write the data into the database while assigning the data rows of the data in the plurality of transactions with the auto-increment IDs for the data rows of the data.

The database can include a plurality of partitions, each partition of the plurality of partitions maintains the auto-increment IDs that are independent from auto-increment IDs of other partitions.

The encapsulation module can be further configured to: provide the plurality of transactions to a transaction queue corresponding to a partition where the transactions of the plurality of transactions belong.

Optionally, the generation module can be further configured to: for each transaction in the transaction queue, generate a batch of auto-increment IDs for the data rows of the data in the transaction according to system time and a number of the data rows contained in the transaction.

In some embodiments, for the data rows in each transaction in the transaction queue, a range of the generated auto-increment IDs is: from one to the number of data rows contained in the transaction, plus a greater one of the following two numerical values: the value of the auto-increment ID generated last time and system time.

An electronic device for processing a database, comprising: a memory and a processor, the memory is configured to store instructions for processing the database; and when being read and executed by the processor, the instructions cause the processor to perform:

providing a plurality of transactions to a transaction queue, wherein each transaction of the plurality of transactions includes an encapsulated write request for writing data into a database; generating auto-increment identifiers (IDs) for data rows of the data corresponding to the plurality of transactions according to an order of the transactions in the transaction queue; and writing the data into the database according to the auto-increment IDs assigned to the data rows of the data corresponding to the plurality of transactions.

DETAILED DESCRIPTION

The technical solutions of the present disclosure will be described in more detail in conjunction with the accompanying drawings and embodiments below. The present disclosure provides a database processing method, apparatus, and an electronic device, which can ensure strict serial auto-increment and can ensure the processing performance in high concurrency.

The embodiments of the present disclosure can provide several advantages. For example, embodiments of the disclosure allow strict serial auto-increment of a primary key column in the database when the primary key column contains the column where the auto-increment ID is located. And the data rows do not need to be locked anymore, which can ensure the performance in a highly concurrent application.

In some embodiments, when transactions are written into a log before being written into a database, the generated maximum auto-increment ID can continue to monotonically increase according to the log when the system fails, thereby ensuring that the subsequently generated auto-increment IDs are monotonically increasing.

In some embodiments, an auto-increment ID generator and a log writing queue can be provided for different partitions in a distributed database, all of which can allow the implementation of serial auto-incrementing of a primary key column within a partition.

In some embodiments, based on an auto-increment ID being generated according to a system time, the serial auto-increment of the auto-increment column may still be ensured in cooperation with a Write-Ahead-Logging, even when system time fallback occurs due to a system failure.

It is contemplated that, if there is no conflict, the embodiments of the present application and various features in the embodiments may be combined with each other, which all fall within the scope of protection of the present application. In addition, although a logical order is shown in the flow chart, the shown or described steps may be executed in an order different from the order herein in some cases.

Figure 1A:
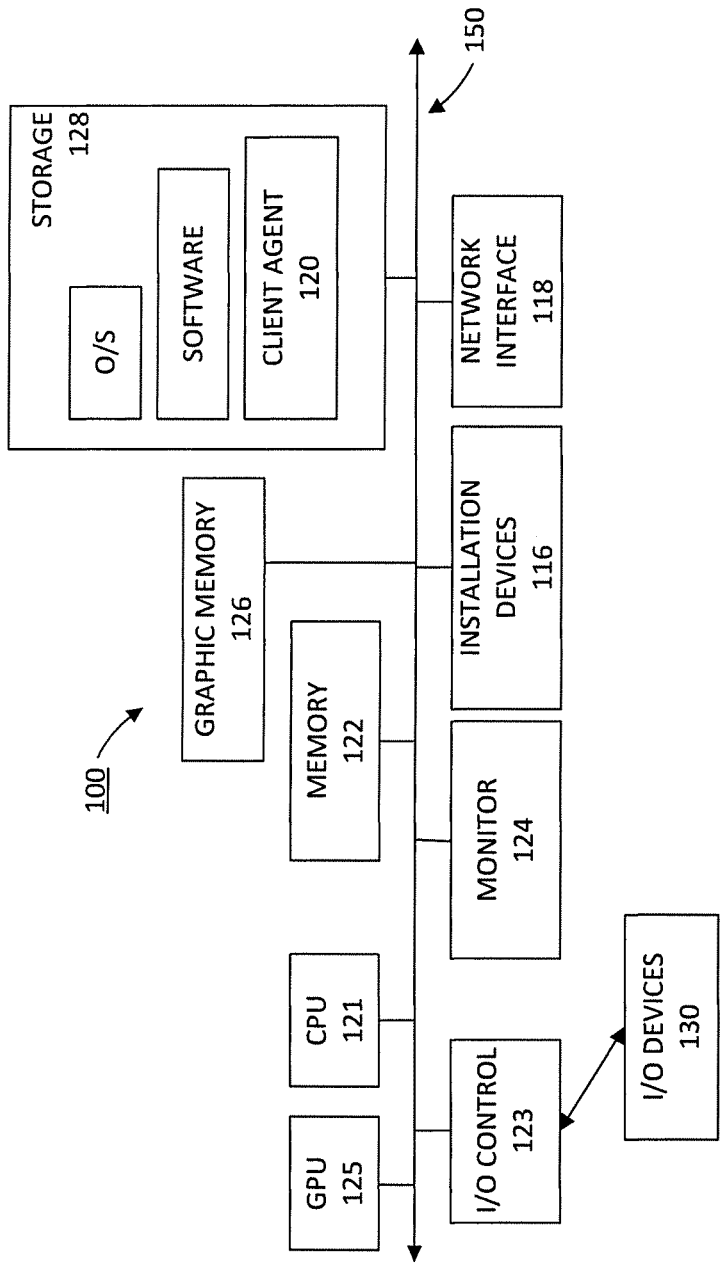
FIGS. 1A-1B are block diagrams illustrating an exemplary computer system that can be used for implementing embodiments consistent with the present disclosure.
Figure 1B:
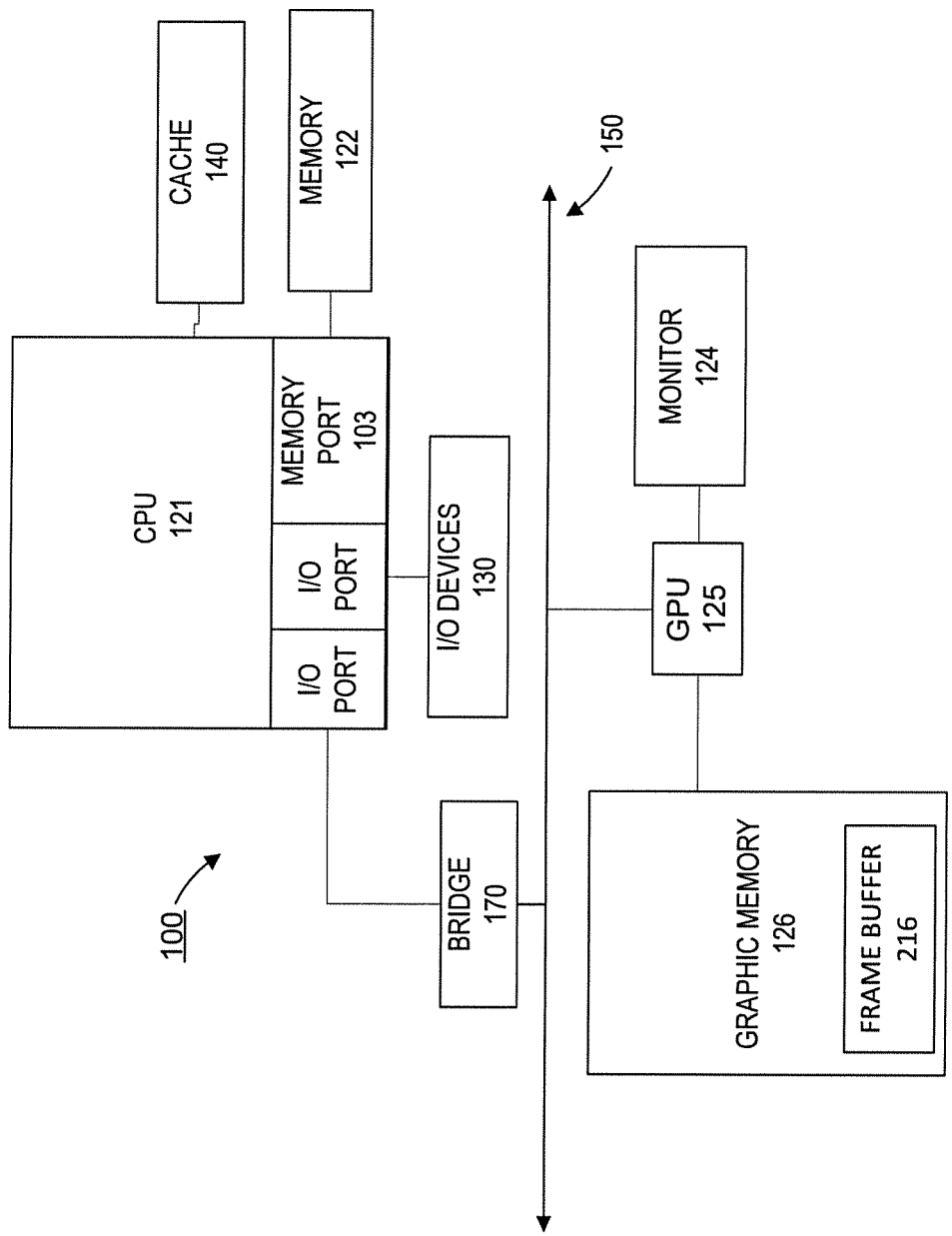

FIGS. 1A-1B are block diagrams illustrating an exemplary computer system 100 that can be used for implementing embodiments consistent with the present disclosure, including the exemplary systems and methods described herein. A computer system 100 can be used for modifying memory data of a virtual machine. The arrangement and number of components in computer system 100 is provided for purposes of illustration. Additional arrangements, number of components, or other modifications can be made, consistent with the present disclosure.

As shown in FIGS. 1A-1B, a computer system 100 can include one or more central processing units (CPUs) 121 for executing instructions. CPU(s) 121 can include any logic circuitry that responds to and processes instructions received from one or more memories 122 and/or storage devices 128. CPU(s) 121 can include a single or multiple microprocessors, field-programmable gate arrays (FPGAs), or digital signal processors (DSPs) capable of executing particular sets of instructions stored in one or more memories 122, storage devices 128, and/or caches (e.g., cache(s) 140).

A computer system 100 can include one or more memories 122, storage devices 128, and/or caches 140, configured to store data and/or software instructions used by CPU(s) 121 to perform operations consistent with disclosed embodiments. For example, computer system 100 can include one or more memories 122 and/or storage devices 128 configured to store one or more software programs that, when executed by CPU(s) 121, cause CPU(s) 121 to perform functions and/or operations consistent with disclosed embodiments. By way of example, a memory 122 and/or storage device 128 can include one or more tangible and/or non-transitory computer-readable mediums, such as NOR or NAND flash memory devices, flexible disks, hard disks, read-only memories (ROMs), random access memories (RAMs), compact disk read-only memories (CD ROMs), magneto-optical (MO) drives, digital versatile disk read-only memories (DVD-ROMs), digital versatile disk random-access memories (DVD-RAMs), semiconductor memories, tape drives, redundant array of independent disks (RAID arrays), register, cache, etc. A memory 122 and/or storage device 128 can include one or more memory chips capable of storing data and/or allowing storage locations to be directly accessed by CPU(s) 121. In some embodiments, CPU(s) can communicate with one or more memories 122 and/or storage devices 128 via a system bus 150. A computer system 100 can include any number of memories 122 and/or storage devices 128. Memories 122 and/or storage devices 128 can be located remotely and computer system 100 can be able to access other memories 122 and/or storage devices 128 via a network, such as private network(s) and/or public network(s). One or more memories 122 and/or storage devices 128 can be configured to store data, and can store data received from one or more server(s), backend system(s), and/or client device(s). One or more memories 122 and/or storage devices 128 can also store one or more operating systems, application software programs, and/or other software.

A computer system 100 can also include one or more graphics processing units (GPUs) 125. A GPU 125 can be any type of specialized circuitry that can manipulate and alter memory (e.g., a graphic memory 126) to provide and/or accelerate the creation of images stored in a frame buffer (e.g., frame buffer 216 shown in FIG. 1B) for output to one or more physical monitors (e.g., physical monitor(s) 124). GPUs can have a highly parallel structure making them more effective than CPUs 121 for algorithms where processing of large blocks of graphical data can be performed in parallel. Furthermore, the functionality of one or more GPUs 125 can also be included in a chipset in some other type of special purpose processing unit or co-processor.

CPU(s) 121 can connect to system interface(s) 150, and can connect with one or more memories 122 and/or storage devices 128 over system interface(s) 150. CPU(s) 121 can also communicate with one or more memories 122 and/or storage devices 128 over a serial communication bus and/or using point-to-point communication. Similarly, GPU(s) 125 can communicate with one or more graphic memories 126, memories 122, and/or storage devices 128 using system interface(s) 150 and/or using other types of busses. CPU(s) 121 can execute programming instructions stored in one or more memories 122, operate on data stored in one or more memories 122, and/or communicate with GPU(s) 125 through system interface(s) 150, which bridge communication between CPU(s) 121 and GPU(s) 125. In some embodiments, CPU(s) 121, GPU(s) 125, system interface(s) 150, or any combination thereof, can be integrated into a single processing unit. GPU(s) 125 can be capable of executing particular sets of instructions stored in one or more memories 122 to manipulate graphical data stored in one or more memories 122 and/or one or more graphic memories 126. For example, GPU(s) 125 can receive instructions transmitted by CPU(s) 121 and process the instructions in order to render graphics data stored in one or more graphic memories 126. A graphic memory 126 can be any memory accessible by GPU(s) 125, including a local memory, a system memory, an on-chip memory, a hard disk, and/or any other type of memory 122 or storage device 128. GPU(s) 125 can enable displaying of graphical data stored in one or more graphic memories 126 on physical monitor(s) 124.

A computer system 100 can also include one or more physical monitors 124 for displaying data and information. Physical monitor(s) 124 can be implemented using one or more display panels, which can include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, microdisplays, or any combination of the above types of displays.

A computer system 100 can further include one or more input/output (I/O) devices 130 connected through an I/O controller 123, both of which can communicate via system interface(s) 150. An I/O device 130 can include, for example, one or more keys, buttons, keyboards, mice, joysticks, styluses, gesture sensors (e.g., video cameras), and/or voice sensors (e.g., microphones). Keys, keyboards, and/or buttons can be physical and/or virtual (e.g., provided on a touch screen interface). I/O device(s) 130 can also include a storage device and/or an installation medium for one or more of client devices.

A computer system 100 can support one or more installation devices 116, such as floppy disk drives for receiving floppy disks (e.g., 3.5-inch, 5.25-inch, or Zip Disks), CD-ROM drives, CD-R/RW (readable/rewritable compact disc) drives, DVD-ROM drives, tape drives, universal serial bus (USB) devices, hard-drives, and/or any other device suitable for installing software and programs, such as a client agent 120, or portion thereof. Installation device(s) 116 could also be used as storage device(s) 128.

A computer system 100 can further include one or more network interfaces 118 for interfacing to a network, such as a PAN, LAN, MAN, WAN, and/or the Internet through a variety of connections, including, but not limited to, standard telephone lines, LAN or WAN links (e.g., 802.11, T1, T3, 56 kb, X.25), broadband connections (e.g., integrated services digital network (ISDN), Frame Relay, asynchronous transfer mode (ATM)), wireless connections, or some combination of any or all of the above. Network interface(s) 118 can comprise a built-in network adapter, network interface card, personal computer memory card international association (PCMCIA) network card, card bus network adapter, wireless network adapter, USB network adapter, modem, and/or any other device suitable for interfacing computer system 100 to any type of network.

As illustrated in FIG. 1B, CPU(s) 121 of a computer system 100 can communicate directly with one or more memories 122 via one or more memory ports 103, and similarly GPU(s) 125 can communicate directly with one or more graphic memories 126. CPU(s) 121 can also communicate with cache(s) 140 via one or more secondary busses, sometimes referred to as backside busses. In some embodiments, CPU(s) 121 can communicate with cache(s) 140 via system interface(s) 150. A cache 140 can have a faster response time than a memory 122. In some embodiments, such as in the embodiments illustrated in FIG. 1B, CPU(s) 121 can communicate directly with I/O device(s) 130 via one or more I/O ports. In further embodiments, I/O device(s) 130 can include one or more bridges 170 between system interface(s) 150 and one or more external communication busses, such as USB busses, Apple Desktop Busses, RS-232 serial connections, small computer system interface (SCSI) busses, FireWire busses, Ethernet busses, ATM busses, high performance parallel interface (HIPPI) busses, Super HIPPI busses, SerialPlus busses, SCI/LAMP busses, FibreChannel busses, and/or Serial Attached small computer system interface busses.

As shown in FIG. 1B, GPU(s) 125 can also communicate directly with one or more graphic memories 126, memories 122, storage devices 128, and/or monitor(s) 124. GPU(s) 125 can communicate with CPU(s) 121 and/or other devices through system interface(s) 150. One or more graphic memories 126 can also include one or more frame buffers 216. A frame buffer 216 can be a graphic output device that drives one or more physical monitors (e.g., physical monitor(s) 124) from one or more memory buffers of one or more graphic memories 126 containing a complete frame of graphical data. Frame buffer(s) 216 can store one or more final graphical frames, which are to be displayed on physical monitor(s) 124.

An aspect of the disclosure is directed to a database processing method.

Data can be written into a database by storing the data in a table, so that related data can be held in a structured format. A table can include columns and rows. Table 1 is an exemplary table for storing data.

For example, in Table 1, it contains six columns and several rows. Each column of the first row indicates the nature of the data in the same column, including a partition key, an auto-increment ID, a source user, a target user, a message content, and a message type.

TABLE 1

| Partition Key | Auto-increment ID | Source user | Target user | Message Content | Message type |
|---|---|---|---|---|---|
| 8 | 105 | A | B | UVW | I |
| 9 | 106 | B | C | OPQ | II |
| 10 | 107 | C | A | RST | III |
| ... | ... | ... | ... | ... | ... |

Data can be stored in a partition of a table. The partition refers to a basic scheduling unit having balanced loads for storing data in the table. By partitions, horizontal scalability of data storage may be achieved.

A partition key (e.g., the first column in Table 1) can indicate the value of a partition to which the partition key belongs. The ranges of partition keys are in one-to-one correspondence to the partitions. For example, partition keys 1-100 can correspond to a first partition, and partition keys 101-200 can correspond to a second partition.

The partition key is a primary key of Table 1. The primary key can be a unique identifier for each data row in the table, which may contain one or more columns. The components of the primary key must be specified when the table is created. For example, the primary key can include the name and data type of each column in the primary key and the order of the columns in the primary key.

The primary key column can be a column contained by the primary key.

The auto-increment identifier (ID) can be a value that can be incremented automatically by rows of a column when the auto-increment ID is assigned to the column.

Accordingly, a column that has the auto-increment ID as the its content (or, a value) is an auto-increment column (e.g., the second column in Table 1). A database can include one or more auto-increment columns. The auto-increment column can ensure that the order of the contents in data rows is consistent with the write order of the contents in the table. In some embodiments, the auto-increment ID can also be a primary key, and thus the column corresponding to the auto-increment ID can be a primary key column.

When the primary key column contains an auto-increment column, the primary key column can be also auto-increment.

As shown in Table 1, the first two columns may be regarded as the primary key columns. The column of the Partition Key is the first column in the order of the columns, and the column of the Auto-increment ID is the second column in the order. The column of the Auto-increment ID can contain auto-increment IDs incrementing by rows. For example, the first, second, and third rows of the column of the Auto-increment ID are assigned with "105", "106", and "107", respectively. Also as a primary key column, the column of the Partition Key can contain auto-increment IDs incrementing by rows. For example, the first, second, and third rows of the column of the Partition Key are assigned with "8", "9", and "10", respectively. Therefore, in the first row of the table, (8, 105) may serve as the primary keys of the row. The primary key column in Table 1 is auto-increment.

Updating the table can be performed by a transaction. The transaction (Txn) is a logical unit during an execution process of a database system. For example, a transaction can represent any change in a database. The transaction can contain properties, such as atomicity, consistency, isolation, and durability.

The atomicity refers to that when a transaction changes data in a database, all the changes to data can be performed or none. The consistency refers to that the database must be in a consistent state before and after a transaction is executed. For example, the consistency ensures any transaction will bring the database from one valid state to another. The isolation refers to the state of data when a transaction checks the data, which must be a state before or after another concurrent transaction modifies the same, and the transaction will not check data in an intermediate state. For example, the isolation ensures that the concurrent execution of transactions results in a system state that would be obtained if transactions were executed successively, i.e., one after the other. The durability refers to that a transaction has a permanent effect on the system after it is completed, and the transaction will be maintained all the time even though there is a system failure. For example, the durability ensure that once a transaction has been committed, it will remain so, even in the event of power loss, crashes, or errors.

In concurrently executed database transactions (Txns), for each successfully submitted transaction, the primary key column thereof is greater than the primary key columns of all the transactions that have been successfully submitted previously. Therefore, the primary key column is auto-incrementing in serial. When the primary key column contains an auto-increment column, serial auto-increment of the primary key column may refer to that with regard to each successfully submitted transaction, the value of the auto-increment column is greater than the values of auto-increment columns of all the transactions which have been successfully submitted previously.

A Write-Ahead-Logging (WAL) is an efficient log recording mode in a database. In some embodiments, after restarting the database, the database can be reinstalled to a state before restarting of the database by replaying a log file, because all the modifications generated when a transaction is submitted will be written in the log file first.

Figure 2:
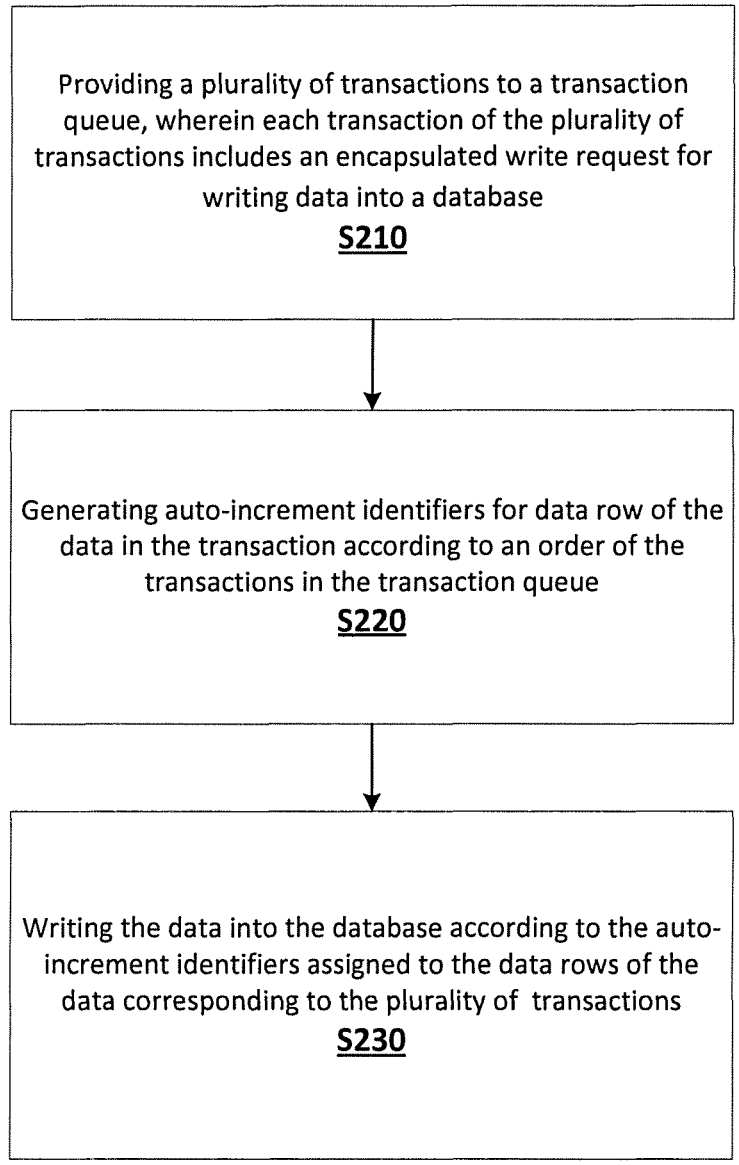
FIG. 2 is a flow chart of a database processing method, consistent with embodiments of the disclosure.

FIG. 2 is a flow chart of a database processing method 200, consistent with embodiments of the disclosure. Method 200 can be implemented by, for example, computer system 100, and include steps S210-S230.

In step S210, a plurality of transactions to a transaction queue can be provided, wherein each transaction of the plurality of transactions includes an encapsulated write request for writing data (e.g., new data) into a database. For example, the transactions can be successively put in a transaction queue.

In step S220, auto-increment identifiers (IDs) for data row of the data in the transaction can be generated according to an order of the transactions in the transaction queue.

In step S230, the data can be written into the database according to the auto-increment identifiers (IDs). The auto-increment IDs can be assigned to the data rows of the data in the transaction.

In some embodiments, after a transaction encapsulated from each write request for writing data in the database is put into the transaction queue, auto-increment IDs that are monotonically increasing can then be assigned in a unified manner. Therefore, the data rows may be auto-incrementing without being locked, which can ensure the performance in a highly concurrent application. The data written in the database contains the generated auto-increment IDs. When the primary key column contains the column where the auto-increment IDs are located, strict serial auto-increment of the primary key column in the database can be ensured, because the order of the auto-increment IDs is consistent with the submission order of transactions (i.e., the order of transactions in the transaction queue). Method 200 not only can satisfy serial auto-increment and high concurrency, but also can provide an easy and convenient solution.

In some embodiments, one transaction may contain one or more data rows. The generated auto-increment IDs are in one-to-one correspondence to the data rows. For example, when a transaction contains three data rows, there are three auto-increment IDs generated in total for the data rows in the transaction. When one transaction contains a plurality of data rows, the auto-increment ID of a precedent data row in the transaction may be less than the auto-increment ID of a later data row. For example, the order of the three auto-increment IDs in the transaction containing three data rows above is consistent with the order of the three data rows in the transaction. For instance, if the auto-increment IDs generated for the data rows in the transaction are 10, 11 and 12, then the auto-increment IDs of the first, second, and third data rows in the transaction are respectively 10, 11, and 12. After the transaction is submitted, the three data rows contained in the transaction are respectively assigned with the auto-increment IDs and then written in the database. That is to say, in the three data rows written in the database, the values of the auto-increment columns are respectively 10, 11, and 12.

In some embodiments, the order of transactions in the transaction queue may be consistent with the order for encapsulating the transactions. For example, the position of an earlier encapsulated transaction in the transaction queue is prior to that of a later encapsulated transaction. The order of auto-increment IDs of data rows in different transactions may also be consistent with the order of the transactions in the transaction queue. For example, the auto-increment IDs (such as 1, 2, . . . , 100) of data rows in a transaction at a prior position in the transaction queue (put in the transaction queue earlier) are less than the auto-increment IDs (such as 101, 102, . . . ) of data rows in a transaction at a posterior position (put in the transaction queue later). Or, the auto-increment ID of the last data row in the transaction at a prior position is less than the auto-increment ID of the first data row in the transaction at a posterior position. Generally, a write request received earlier will be encapsulated into a transaction earlier. Therefore, the order of auto-increment IDs of data rows in different transactions is also consistent with the order of receiving write requests encapsulated into the transactions. For example, with regard to write requests for writing data in the database, the auto-increment IDs of data rows in the transaction encapsulated from a write request received earlier are less than the auto-increment IDs of data rows in the transaction encapsulated from a write request received later.

In some embodiments, when a transaction is submitted, data associated with the transaction is written into the database. Therefore, when writing in the database is performed, it may also be carried out according to an order of the transactions in the transaction queue. After the transaction has been submitted, the submitted transaction can be deleted from the transaction queue. That is, the transaction queue can be a first-in-first-out (FIFO) queue. After transactions encapsulated from write requests for writing data in the database has been submitted, one or more data rows will be added to the table of the database, and the auto-increment IDs of the data rows in the transaction will be filled in an auto-increment column in the data rows. Therefore, the order of the auto-increment IDs in the auto-increment column of the data rows in the table is associated with the order of receiving the write requests. For example, the order of the auto-increment IDs is consistent with the order of receiving the write requests.

For instance, when multiple users all send a message to a user A, a message sent to the user A needs to be firstly written in the database by a server and then to be read for the user A via a background process. In some embodiments, all the messages may be regarded as write requests for writing data into the database. The order of these messages arriving at the server is associated with the order of the auto-increment IDs of the corresponding data rows in the database. For example, the order of these messages arriving at the server is consistent with the order of the auto-increment IDs. In this way, when the background process reads data in the database, a message received earlier by the server can be sent to the user A earlier, as the data (e.g., the message) is read according to an ascending order of the auto-increment IDs. Therefore, the messages sent to the user A are in serial, and the message will not be lost.

In some embodiments, when a user wishes to modify data that has been written in the database, a write request for updating the data may be sent. The write request for updating the data may contain an auto-increment ID for indicating a data row to be modified. The auto-increment ID in the write request can be an auto-increment ID in the data row that the user wishes to modify. However, in a write request for writing data in the database, the auto-increment ID may not exist, or the auto-increment ID may not be available (e.g., "Null").

The above embodiments are not intended to limit the type of the database, and may be applied to, for example, a distributed database or a stand-alone database, and a relational database or non-relational database.

In some embodiments, the above steps S210-S230 are generally executed in a server, a write request for writing data in the database can be received from a client terminal, and writing in the database can be performed according to the write request. The above steps S210-S230 may be executed in one device, and may also be distributed in different devices for execution. The device for executing the steps S210-S230 above may be the device where the database is located, and may also be another separate device.

In some embodiments, assigning the auto-increment IDs to the data rows of the data in the transaction and then writing the data in the database of step S230 (e.g., the submitting the transactions in the transaction queue successively, and filling the auto-increment ID of each data row in the transaction in the data row and then writing the same in the database) may include: successively writing log data corresponding to the transactions in the transaction queue in a log, the log data including the auto-increment IDs of the data rows in the corresponding transaction; and submitting the transactions corresponding to the log data in the log, and writing the data into the database when respectively assigning the data rows of the data in the transaction with the auto-increment IDs for the data rows of the data.

The above embodiments involve a mode of a Write-Ahead-Logging (WAL), which can ensure that a maximum auto-increment ID among the generated auto-increment IDs can be determined from the log when a system (e.g., computer system 100) fails, thereby ensuring that auto-increment IDs to be generated can monotonically increase.

It is contemplated that some methods other than the WAL method may be used to store the latest auto-increment ID (e.g., the maximum ID) and prepare a backup maximum ID. And the maximum auto-increment ID among the generated auto-increment IDs may also be determined by reading a backed-up auto-increment ID when the system (e.g., computer system 100) fails.

In some embodiments, when the database includes a plurality of partitions, each partition may correspond to one transaction queue. Transactions of each partition are respectively put in the transaction queue corresponding to the partition. Therefore, the encapsulating a write request for writing data in a database into a transaction, and putting the same in a transaction queue of step S210 may further include:

encapsulating write requests for writing the data into a database into a transaction, and putting the encapsulated transaction in a transaction queue corresponding to a partition where the transaction belongs. Therefore, a partition may include several encapsulated transactions.

Furthermore, each partition may separately and independently maintain auto-increment IDs. Therefore, each partition of the plurality of partitions can maintain auto-increment IDs that are independent from auto-increment IDs of other partitions. In other words, the generated auto-increment IDs are serial auto-incrementing within the partition where the generated auto-increment IDs belongs. But the auto-increment IDs among different partitions are not associated with each other.

In some embodiments, an auto-increment ID generator and a transaction queue may be provided for the partitions in the database, respectively. And the transactions in the same partition serially apply for auto-increment IDs after entering the transaction queue, so that serial auto-incrementing of a primary key column in partitions can be implemented. The primary key column may contain columns where the partition keys are located and at least one auto-increment column, and the auto-increment ID generators of different partitions may be different objects.

In the above embodiments, a transaction may be provided in a transaction queue corresponding to a partition where the transaction belongs, according to partition keys. And then an auto-increment ID generator corresponding to the partition where the transaction belongs is called to generate auto-increment IDs for data rows in the transaction.

In some embodiments, transactions of all the partitions may also be mixed together to generate auto-increment IDs.

In addition, with regard to a database having no partitions, one transaction queue and one auto-increment ID generator may be used.

In some embodiments, step S220 may further include:

for each transaction in the transaction queue, generating a batch of auto-increment IDs for the data rows of the data in the transaction according to system time and the number of the data rows contained in the transaction.

In some embodiments, in the batch of auto-increment IDs generated for the data rows in one transaction, the number of auto-increment IDs is the same as the number of the data rows in the transaction. For example, if the transaction has three data rows, then three auto-increment IDs can be generated in one batch for the transaction; and if the transaction only has one data row, then there is only one auto-increment ID in the generated one batch of auto-increment IDs.

Furthermore, when the auto-increment ID is obtained according to the system time, the obtained auto-increment column may not be continuous, though strict serial auto-increment can be ensured. The auto-increment ID obtained according to the system time may provide more information to a user. For example, the time of writing data rows may be determined according to the auto-increment ID.

In some embodiments, the system time refers to a current system time when an auto-increment ID is generated. The system time may be in a time format (e.g., year-month-day-minute-second), and may also be in a numerical value format (e.g., a time length between the current moment and a pre-determined start moment). The time length may be in microseconds (us), as a unit.

In some embodiments, auto-increment IDs are successively generated according to the order of transactions in the transaction queue. Therefore, for a transaction that enters the transaction queue earlier, an auto-increment ID will be generated earlier, thereby generating an earlier system time for the auto-increment ID. Therefore, in the current transaction queue, the auto-increment IDs of data rows in the transaction that enters the transaction queue earlier will be smaller.

In some embodiments, the auto-increment IDs may also be generated according to other methods. For example, an incrementing variable may be taken as the auto-increment ID. In another example, with regard to data rows in transactions in the transaction queue, an auto-increment ID is generated for one data row in one transaction at a time. In other words, a first auto-increment ID of one data row can be generated at a first time, and a second auto-increment ID of a next data row can be generated at a second time. Thus, the system time may be directly used as the auto-increment ID. That is, the auto-increment ID can be directly associated with the system time.

In some embodiments, in step S220, for the data rows in each transaction in the transaction queue, a range of the generated auto-increment IDs can be from one to a number of data rows contained in the transaction, plus a greater one of the following two numerical values: the value of the auto-increment ID generated last time and the system time.

For example, if there is only one data row in a transaction, then there is also only one auto-increment ID generated for the data row in the transaction. The value of the auto-increment ID can be one plus a greater value of the system time and the value of the auto-increment ID generated last time. If there are a plurality of data rows in a transaction, then in a batch of auto-increment IDs generated for the data rows in the transaction, the minimum auto-increment ID is one plus a greater value of the system time and the value of the auto-increment ID generated last time. And the maximum auto-increment ID is the number of data rows contained in the transaction plus a greater value of the system time and the value of the auto-increment ID generated last time.

For example, in a situation where there are three successive transactions A, B, and C in a transaction queue, where the transaction A has one data row, the transaction B has 100 data rows, and the transaction C has 10 data rows, when auto-increment IDs are generated for the data rows in transactions A, B, and C, the system time can be respectively Ta, Tb, and Tc, and Ta<Tb<Tc. When Ta is greater than the auto-increment ID generated last time, then the auto-increment ID generated for the data row in transaction A is Ta+1. When Tb is greater than Ta+1, then the auto-increment IDs generated for the data rows in transaction B are Tb+1 to Tb+100. When Tc is greater than Tb+100, the auto-increment IDs generated for the data rows in transaction C are Tc+1 to Tc+10. And when Tc is smaller than Tb+100, the auto-increment IDs generated for the data rows in the transaction C are Tb+101 to Tb+110.

It is contemplated that, a range from one to the number of data rows contained in the transaction can be further added by a greater value of the system time and the value of the auto-increment ID generated last time to generate a range of the generated auto-increment IDs. The latest auto-increment ID can be, for example, stored in a memory (e.g., memory 122). When a new auto-increment ID is generated, the newly generated auto-increment ID can be used to replace the auto-increment ID stored in the memory. When a process for generating an auto-increment ID is being initialized, the latest auto-increment ID can be the auto-increment ID stored in the memory and generated last time.

In some embodiments, an initial value of an auto-increment ID can be 0 or the current system time, when the auto-increment ID is generated for the first time. For example, when auto-increment IDs are generated for data rows in a first transaction after the system (e.g., computer system 100) starts, a range of the generated auto-increment IDs can be the current system time added by a range of one to the number of data rows in the transaction.

When the above process is implemented in cooperation with the WAL, serial auto-increment of the auto-increment column may still be ensured in the case of system time fallback due to a system failure. When the system is reloaded after the failure, the auto-increment ID in the last piece of log data may be parsed from the log, as the auto-increment ID generated last time. Therefore, it can be ensured that even though the system time falls back, the auto-increment ID will not fall back.

In some embodiments, the system time when the auto-increment IDs of data rows in a submitted transaction are generated can be smaller than the current system time. That is, with regard to a transaction that has already been submitted previously and has been deleted from the transaction queue, the "system time" in the auto-increment IDs of the data rows is smaller than the "system time" in the auto-increment IDs of data rows in the transactions currently in the transaction queue.

If there are too many data rows in a transaction, it is possible that the "system time+number of rows" is not monotonously auto-incrementing. For example, if the number of data rows in one transaction is 100 and the system time when the auto-increment IDs are generated is 80, then the auto-increment ID of the last data row in the transaction is 180. If the auto-increment ID needs to be generated for the first data row in the transaction at a system time of 100 (that is, a period of time after the system time of 80), then the auto-increment ID is the system time plus the number of rows for the first data row, which is 101. Thus, the auto-increment ID of a data row in a transaction with a posterior order is decreased. However, according to embodiments of the disclosure, because a greater value of the "auto-increment ID generated last time" and the "system time" is selected as a basis for obtaining the auto-increment ID, the newly generated auto-increment ID can be necessarily greater than the previous auto-increment ID, and strict serial auto-increment is ensured.

Therefore, if the auto-increment IDs of different partitions are separately and independently maintained, then the "auto-increment ID generated last time" is also independent from each other for each partition. And the "auto-increment ID generated last time" used when the auto-increment ID is generated refers to the latest auto-increment ID of the present partition.

In some further embodiments, the result of the auto-increment ID generated last time added by a range of one to the number of data rows contained in a transaction may also be directly used as a batch of auto-increment IDs.

The above embodiment is described with one example below.

In this example, the database is a non-relational database TableStore, which is based on an Alicloud Apsara distributed system. The TableStore may achieve seamless scalability on scale by data fragmentation and load balancing techniques. In the TableStore, a WAL is used. For each write request, log writing is performed before memory writing (i.e. writing in the database). The first column of primary key columns of each table in the TableStore is partition key, and data of the partition keys within the same range is within the same partition. The TableStore may automatically allocate, according to the range of values of each row of partition keys in the table, data of this row to a corresponding partition. In this example, the auto-increment IDs of data rows in transactions in one partition are allocated by means of an auto-increment ID generator of the partition.

In practice, it is not limited to the above example. The processing method according to embodiments of the disclosure is not limited to any of the above embodiments.

Figure 3:
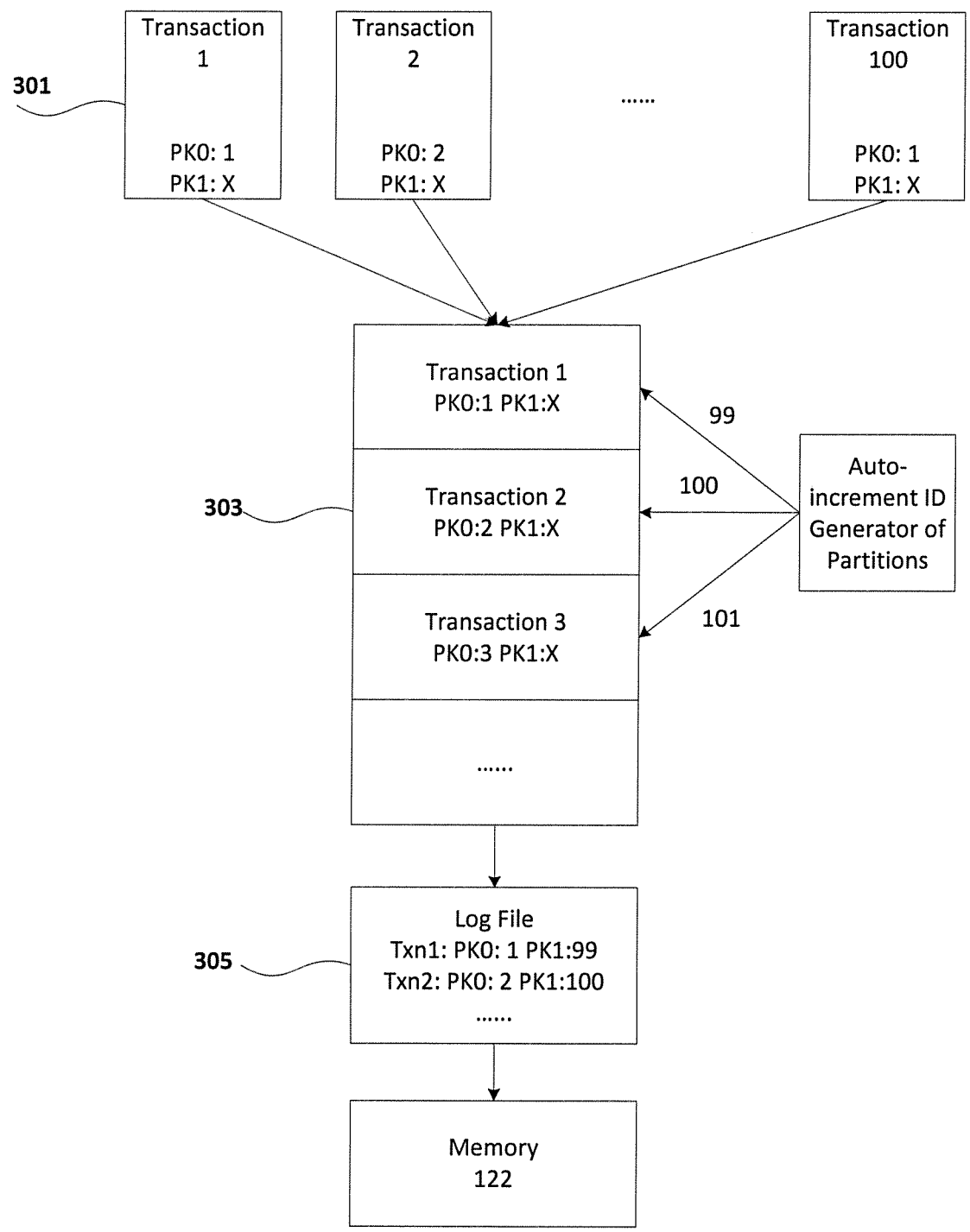
FIG. 3 is a schematic diagram of processing transactions, consistent with embodiments of the disclosure.

FIG. 3 is a schematic diagram for processing transactions, consistent with embodiments of the disclosure. The process first encapsulates a write request into a standard transaction. For example, as shown in FIG. 3, a plurality of write requests are encapsulated into transactions 301 (e.g., including a transaction 1, a transaction 2, . . . , a transaction 100), respectively. It is assumed that transaction 1 to transaction 100 are encapsulated successively, and the auto-increment IDs of the data rows in the 100 transactions are all not available (e.g., "Null"). That is, in transaction 1, PK0 is 1, PK1 is X; in transaction 2, PK0 is 2, PK1 is X; . . . ; in transaction 100, PK0 is 100, PK1 is X, wherein PK0 is a partition key, and the values 0-100 of the partition key in this example are within the same range. That is, the transactions 1-100 all belong to the same partition. PK1 is an auto-increment ID, and X represents "Null".

The transactions are successively put in a transaction queue 303 corresponding to the partition where the transactions are located according to the order of completing the encapsulations. That is, in transaction queue 303, the transactions are successively: transaction 1, transaction 2, transaction 3, . . . , or the like. The auto-increment ID generator of the corresponding partition allocates auto-increment IDs to the transactions in the transaction queue successively. It is assumed in this example that each transaction only contains one data row, and the auto-increment ID allocated to the data row in one transaction is: max (auto-increment ID generated last time+1, system time+1), max representing taking a greater value.

In this example, it is assumed that the auto-increment ID generated last time of the partition or the system time is 98, then the auto-increment IDs allocated to the transactions 1, 2 and 3 are respectively 99, 100 and 101.

The transaction queue above is a first-in-first-out (FIFO) queue. According to the order of transactions in the transaction queue, log data corresponding to the transactions is successively written in a log file 305, and a transaction of which the corresponding log data has been written in log file 305 will be deleted from the transaction queue. It can be seen that, all the writing requests of each partition in this example are serial in log writing, which can ensure the sequential order of the write requests.

In log writing, the log data contains an identifier, PK0 and PK1 of a transaction. PK1 is updated to be auto-increment IDs allocated to data rows in the transaction. After the log data corresponding to the transaction 1 and transaction 2 above has been written in the log, the log will successively contain the log data as follows.

Txn1: PK0: 1; PK1: 99
Txn2: PK0: 2; PK1: 100

After the log writing is performed, the transactions are successively submitted according to the order of log data corresponding to the transactions in the log. That is, the data associated with the transactions are written into a memory (e.g., memory 122). For example, a data row is added in the database, one transaction corresponds to one data row, and the auto-increment ID of the data row in the transaction is put in a column of the corresponding data row of the database, the column is an auto-increment column, and is also one of primary key columns. The partition key of the transaction is also put in one column, as the first column in the table. In this example, the table in the database may refer to Table 1, wherein the columns where the partition key and the auto-increment ID are located are respectively the first column and the second column, both being primary key columns. It can be seen that the value order of the auto-increment values (i.e., values of the auto-increment IDs) of different data rows in the partition key in the same range can be consistent with the order of writing the data rows in the database, and can be consistent with the order of the transactions to which the auto-increment values belong entering the transaction queue. That is, the order of encapsulating write requests into transactions can be consistent with the order of writing the data into the database.

Figure 4:
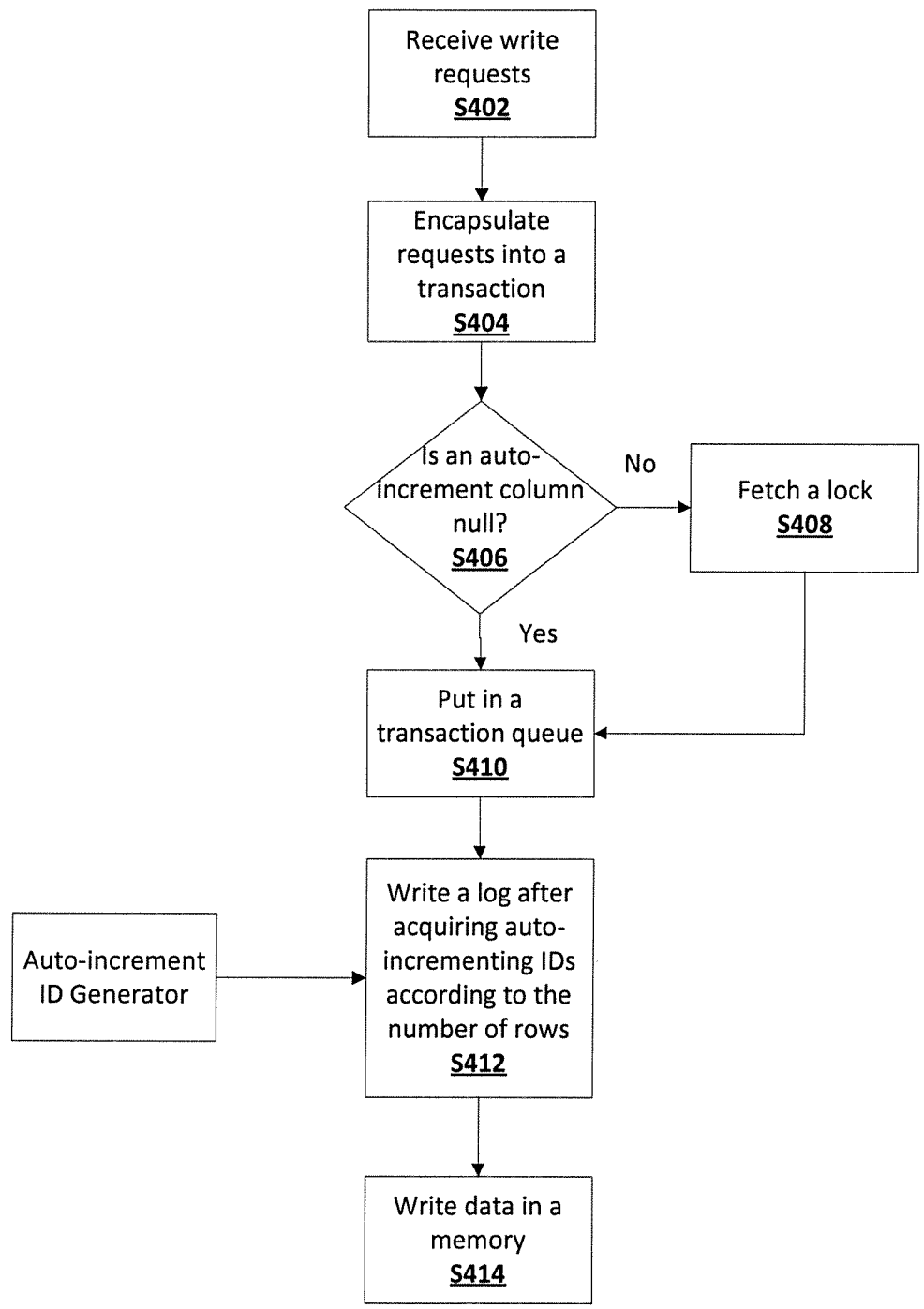
FIG. 4 is a flow chart of processing a write request, consistent with embodiments of the disclosure.

FIG. 4 is a flow chart of a method 400 for processing write requests, consistent with embodiments of the disclosure. Method 400 can be implemented by, for example, computer system 100, and can include steps S402-S414.

In step S402, write requests can be received by computer system 100.

In step S404, write requests can be encapsulated into standard transactions. As shown in FIG. 3, for example, a transaction 1 to a transaction 100 can be generated based on the encapsulation.

In step S406, whether an auto-increment column in the transaction is null can be determined (e.g., whether an auto-increment ID is null).

If the auto-increment column is null (e.g., PK1 is X in the above example), it indicates that the writing request corresponding to the transaction can write data in the database and requires the system (e.g., computer system 100) to generate an auto-increment ID, and method 400 goes to step S410. In step S410, the transaction is directly put in a transaction queue of a partition where the transaction belongs.

If, however, the auto-increment column is not null, it indicates that the write request corresponding to the transaction can update a data row that has been written in the database, and method 400 goes to step S408. And an auto-increment ID can be used to identify a data row to be updated. Therefore, in step S408, when the auto-increment ID is not null, a transaction lock is applied to lock the data row corresponding to the auto-increment ID in the table in the database, so as to avoid other writing requests for updating or querying data in the same row during writing. After the transaction lock is applied successfully, at step S410, the transaction is put in the transaction queue of the partition where the transaction belongs.

In step S412, after the transaction enters the transaction queue, auto-increment IDs for data rows each having a null auto-increment ID in the transaction can be successively generated. And during generation, a batch of auto-increment IDs can be acquired from an auto-increment ID generator of the partition where the transaction belongs, according to the number of data rows contained in the transaction. For example, three auto-increment IDs can be acquired if a transaction contains three data rows. With regard to a transaction where the auto-increment ID is not null, a new auto-increment ID is no longer generated. Log data corresponding to transactions where the auto-increment ID has been acquired in the transaction queue is written in the log successively according to the order of the transactions in the transaction queue, and the auto-increment IDs of the data rows in the transactions are written in the log with the log data corresponding to the transactions.

In step S414, after the log writing is performed, transactions can be successively submitted according to the order in the log, the data can be written in the database. With regard to a transaction corresponding to a write request for writing the data in the database, one or more data rows can be added to the database after the transaction is submitted. During the writing of the data in the database, auto-increment IDs of the data rows can be respectively filled in the corresponding data rows. And the data can then be written in the database, where the auto-increment IDs of the data rows can generate auto-increment columns. After the writing is completed, the corresponding write request is completed. With regard to a transaction corresponding to a write request for updating data, corresponding data rows in the database will be modified after the transaction is submitted. And after the modification is completed, the corresponding writing request is completed and the transaction lock is released.

Figure 5:
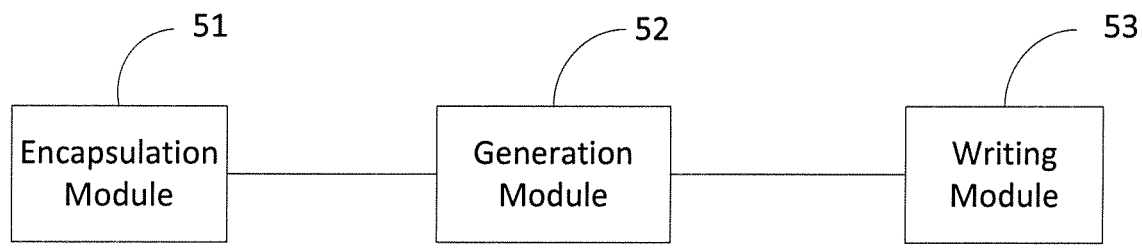
FIG. 5 is a schematic diagram of a database processing apparatus, consistent with embodiments of the disclosure.

FIG. 5 is a schematic diagram of a database processing apparatus 500, consistent with embodiments of the disclosure. Database processing apparatus 500 can include an encapsulation module 51, a generation module 52, and a writing module 53.

Encapsulation module 51 can be configured to provide a plurality of transactions to a transaction queue, wherein each transaction of the plurality of transactions includes an encapsulated write request for writing data into a database.

Encapsulation module 51 can be further configured to provide the encapsulated transaction in a transaction queue corresponding to a partition where the transaction belongs.

Generation module 52 can be configured to generate auto-increment identifiers (IDs) for data rows of the data corresponding to the plurality of transactions according to an order of the transactions in the transaction queue.

Generation module 52 can be further configured to, for each transaction in the transaction queue, generate a batch of auto-increment IDs for the data rows of the data in the transaction according to system time and a number of the data rows contained in the transaction.

Generation module 52 can be further configured to, for the data rows in each transaction in the transaction queue, generate a range of the auto-increment IDs of from one to the number of data rows contained in the transaction, plus a greater one of the following two numerical values: the value of the auto-increment ID generated last time, and system time.

Assigning module 53 can be configured to write the data in the database according to the auto-increment IDs assigned to the data rows of the data in the transaction. In some embodiments, assigning module 53 can further include a log writing unit and a data writing unit. The log writing unit can be configured to successively write log data corresponding to the transactions in the transaction queue in a log. The log data can include the auto-increment IDs of the data rows of the data in the corresponding transaction. The database writing unit can be configured to successively submit the transactions corresponding to the log data in the log, and to write the data into the database when respectively assigning the data rows of the data in the transaction with the auto-increment IDs for the data rows of the data.

In some embodiments, an auto-increment ID for data rows of the data of a precedent data row in the transaction is less than the auto-increment ID of a later data row. In some embodiments, when one transaction contains a plurality of data rows, the auto-increment ID of a precedent data row in the transaction is less than the auto-increment ID of a later data row. In some embodiments, when the database includes a plurality of partitions, each partition may separately and independently maintain the auto-increment IDs.

In some embodiments, encapsulation module 51, generation module 52, and assigning module 53 can be software, hardware, or a combination thereof. In general, a module/unit (and any corresponding sub-modules or sub-units) can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. Generally, the modules described herein refer to logical modules that can be combined with other modules or divided into sub-modules despite their physical organization or storage.

The operations of various modules of database processing apparatus 500 can correspond to steps S210-S230 as discussed above, description of which will be omitted herein for clarity.

Embodiments of the disclosure further provide an electronic device for writing a database, including: a memory and a processor, The memory can be configured to store instructions for writing the database, and when being read and executed by the processor, the instructions cause the electronic device to perform: providing a plurality of transactions to a transaction queue, wherein each transaction of the plurality of transactions includes an encapsulated write request for writing data into a database; generating auto-increment identifiers (IDs) for data rows of the data corresponding to the plurality of transactions according to an order of the transactions in the transaction queue; and writing the data into the database according to the auto-increment IDs assigned to the data rows of the data in the transaction.

In this embodiment, when the instructions for writing data into a database is read and executed by the processor, the processor can perform operations corresponding to steps S210-S230 discussed above, and the description of which can be omitted herein for clarity.

Those of ordinary skills in the art may understand that all or some of the steps of the method above may be implemented by means of a program for instructing relevant hardware. The program may be stored in a computer readable storage medium, for example, a read-only memory, a magnetic disk or an optical disk and the like. Optionally, all or some of the steps in the embodiments above may also be implemented using one or more integrated circuits. Correspondingly, the various modules/units in the embodiments above may be implemented in the form of hardware, and may also be implemented in the form of software functional modules. The present application is not limited to any particular form of combination of hardware and software.

Certainly, there may also be a variety of other embodiments of the present application. Those skilled in the art may make various corresponding changes and variations according to the present application without departing from the spirit and essence of the present application, but these corresponding changes and variations should all fall within the scope of protection of the claims of the present application.

What is claimed is:

1. A database processing method, comprising:
providing a plurality of transactions to a transaction queue, wherein each transaction of the plurality of transactions includes one or more rows of data to be written into a database;
generating auto-increment identifiers (IDs) for each row in each of the plurality of transactions according to an order of the transactions in the transaction queue, wherein a last ID of a last data row of a first transaction is assigned a lower ID than a first ID of a first row of a second transaction, wherein the second transaction is later in the transaction queue than the first transaction; and
writing the rows of data into the database according to the auto-increment IDs assigned to the rows of the data corresponding to the plurality of transactions, whereby the rows of data are assigned IDs in an order corresponding to an order of the transactions in the transaction queue.

2. The database processing method according to claim 1, wherein
an auto-increment ID for each data row of a precedent transaction in the transaction queue is less than an auto-increment ID for each data row of a later transaction in the transaction queue; and
when one transaction contains a plurality of rows of data, the auto-increment ID of a precedent data row in the transaction is less than the auto-increment ID of a later data row in the transaction.

3. The database processing method according to claim 1, wherein writing the rows of data into the database further comprises:
writing log data corresponding to the plurality of transactions in the transaction queue in a log, the log data comprising the auto-increment IDs of the rows of data in the corresponding plurality of transactions; and
submitting the plurality of transactions corresponding to the log data in the log; and
writing the data into the database while assigning auto-increment IDs to the rows of data in the plurality of transactions.

4. The database processing method according to claim 1, wherein
the database comprises a plurality of partitions, each partition of the plurality of partitions maintains auto-increment IDs that are independent from auto-increment IDs of other partitions; and
the database processing method further comprises:
providing the plurality of transactions to a transaction queue corresponding to a partition where the plurality of transactions belong.

5. The database processing method according to claim 1, wherein generating auto-increment identifiers further comprises:
for each transaction in the transaction queue, generating a batch of auto-increment IDs for the rows of data in the transaction according to a system time and a number of data rows contained in the transaction.

6. The database processing method according to claim 5, wherein:
for the rows of data in each transaction in the transaction queue, a range of the generated auto-increment IDs is from one to the number of rows of data contained in the transaction, plus a greater one of the following two numerical values: the value of the auto-increment ID generated last time, and the system time.

7. A database processing apparatus, comprising:
a memory storing a set of instructions; and
one or more processors configured to execute the set of instructions to cause the apparatus to perform:
providing a plurality of transactions to a transaction queue, wherein each transaction of the plurality of transactions includes one or more rows of data to be written into a database;
generating auto-increment identifiers (IDs) for each row in each of the plurality of transactions according to an order of the transactions in the transaction queue, wherein a last ID of a last data row of a first transaction is assigned a lower ID than a first ID of a first row of a second transaction, wherein the second transaction is later in the transaction queue than the first transaction; and
writing the rows of data into the database according to the auto-increment IDs assigned to the rows of the data corresponding to the plurality of transactions,
whereby the rows of data are assigned IDs in an order corresponding to an order of the transactions in the transaction queue.

8. The database processing apparatus according to claim 7, wherein:
an auto-increment ID for each data row of a precedent transaction in the transaction queue is less than an auto-increment ID for each data row of a later transaction in the transaction queue; and
when one transaction contains a plurality of rows of data, the auto-increment ID of a precedent data row in the transaction is less than the auto-increment ID of a later data row in the transaction.

9. The database processing apparatus according to claim 7, wherein, for writing the rows of data into the database, the set of instructions is executable by the one or more processors to cause the apparatus to further perform:
writing log data corresponding to the plurality of transactions in the transaction queue in a log, the log data comprising the auto-increment IDs of the rows of data in the corresponding plurality of transactions; and
submitting the plurality of transactions corresponding to the log data in the log; and
writing the data into the database while assigning auto-increment IDs to the rows of data in the plurality of transactions.

10. The database processing apparatus according to claim 7, wherein:
the database comprises a plurality of partitions, each partition of the plurality of partitions maintains auto-increment IDs that are independent from auto-increment IDs of other partitions; and
the set of instructions is executable by the one or more processors to cause the apparatus to further perform providing the plurality of transactions to a transaction queue corresponding to a partition where the plurality of transactions belong.

11. The database processing apparatus according to claim 7, wherein, for generating auto-increment identifiers, the set of instructions is executable by the one or more processors to cause the apparatus to further perform:
for each transaction in the transaction queue, generating a batch of auto-increment IDs for the rows of data in the transaction according to system time and a number of data rows contained in the transaction.

12. The database processing apparatus according to claim 11, wherein for the rows of data in each transaction in the transaction queue, a range of the generated auto-increment IDs is from one to the number of rows of data contained in the transaction, plus a greater one of the following two numerical values: the value of the auto-increment ID generated last time, and the system time.

13. A non-transitory computer readable medium that stores a set of instructions that is executable by at least one processor of an electronic device to cause the electronic device to perform a database processing method, the method comprising:
providing a plurality of transactions to a transaction queue, wherein each transaction of the plurality of transactions includes one or more rows of data to be written into a database;
generating auto-increment identifiers (IDs) for each row in each of the plurality of transactions according to an order of the transactions in the transaction queue, wherein a last ID of a last data row of a first transaction is assigned a lower ID than a first ID of a first row of a second transaction, wherein the second transaction is later in the transaction queue than the first transaction; and writing the rows of data into the database according to the auto-increment IDs assigned to the rows of the data corresponding to the plurality of transactions, whereby the rows of data are assigned IDs in an order corresponding to an order of the transactions in the transaction queue.

14. The non-transitory computer readable medium according to claim 13, wherein an auto-increment ID for each data row of a precedent transaction in the transaction queue is less than an auto-increment ID for each data row of a later transaction in the transaction queue; and when one transaction contains a plurality of rows of data, the auto-increment ID of a precedent data row in the transaction is less than the auto-increment ID of a later data row in the transaction.

15. The non-transitory computer readable medium according to claim 13, wherein the set of instructions is executable by the at least one processor of the electronic device to cause the electronic device to further perform:

writing log data corresponding to the plurality of transactions in the transaction queue in a log, the log data comprising the auto-increment IDs of the rows of data in the corresponding plurality of transactions;

submitting the plurality of transactions corresponding to the log data in the log; and writing the data into the database while assigning auto-increment IDs to the rows of data in the plurality of transactions.

16. The non-transitory computer readable medium according to claim 13, wherein the database comprises a plurality of partitions, each partition of the plurality of partitions maintains auto-increment IDs that are independent from auto-increment IDs of other partitions; and the set of instructions is executable by the at least one processor of the electronic device to cause the electronic device to further perform:

providing the plurality of transactions to a transaction queue corresponding to a partition where the transactions of the plurality of transactions belong.

17. The non-transitory computer readable medium according to claim 13, wherein the set of instructions is executable by the at least one processor of the electronic device to cause the electronic device to further perform:

for each transaction in the transaction queue, generating a batch of auto-increment IDs for the rows of data in the transaction according to system time and a number of data rows contained in the transaction.

18. The non-transitory computer readable medium according to claim 17, wherein:

for the rows of data in each transaction in the transaction queue, a range of the generated auto-increment IDs is from one to the number of rows of data contained in the transaction, plus a greater one of the following two numerical values: the value of the auto-increment ID generated last time, and the system time.

* * * * *